No. 851,904. PATENTED APR. 30, 1907.
T. C. STEIMER.
SECTIONAL MOLD.
APPLICATION FILED FEB. 27, 1906.

WITNESSES:
J. Herbert Bradley.
Chas. S. Sepley.

INVENTOR,
Theodore C. Steimer,
Per F. W. H. Clay
Atty.

UNITED STATES PATENT OFFICE.

THEODORE C. STEIMER, OF BUCKHANNON, WEST VIRGINIA.

SECTIONAL MOLD.

No. 851,904.        Specification of Letters Patent.        Patented April 30, 1907.

Application filed February 27, 1906. Serial No. 303,258.

*To all whom it may concern:*

Be it known that I, THEODORE C. STEIMER, a citizen of the United States, residing at Buckhannon, in the county of Upshur and State of West Virginia, have invented certain new and useful Improvements in Sectional Molds, of which the following is a specification.

My invention relates to the art of molding articles from plastic material, such as molten glass, and particularly to molding articles having irregular surfaces, which cannot be drawn directly, but require a sectional mold opening away from the surface.

The objects of the invention are, to separate the parts of the mold from the article in a true radial direction, to avoid marring the surface; to open and close the parts automatically; to utilize the pressure of the plunger and its ring to press the joints of the mold closer together; to render the parts easily interchangeable and reduce the cost; to provide superior means for operating, and to generally improve the construction and action of sectional molds. These objects and other advantages to appear hereinafter, are attained by the structures illustrated in the accompanying drawings.

Figure 1:
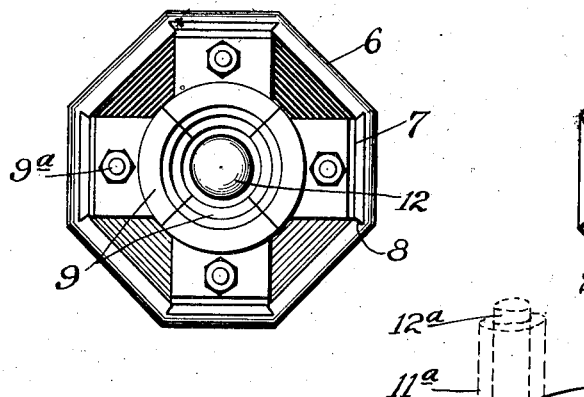
Figure 3:
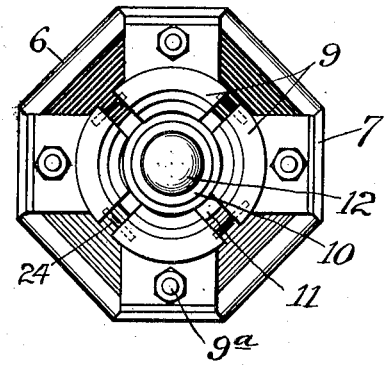
Figure 5:
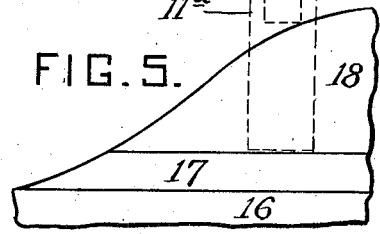
Figure 2:
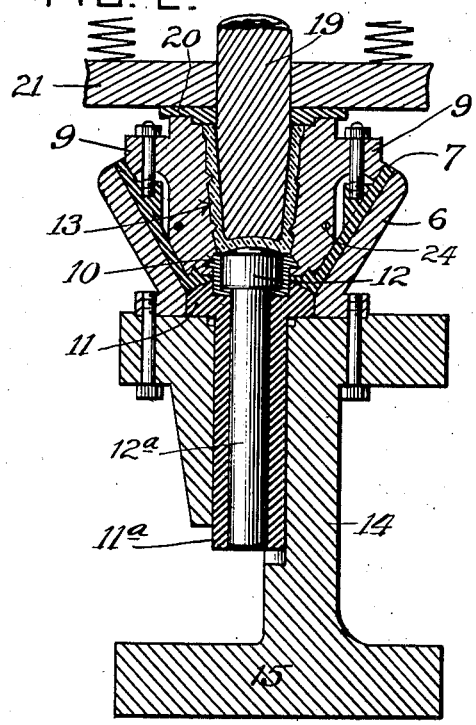
Figure 4:
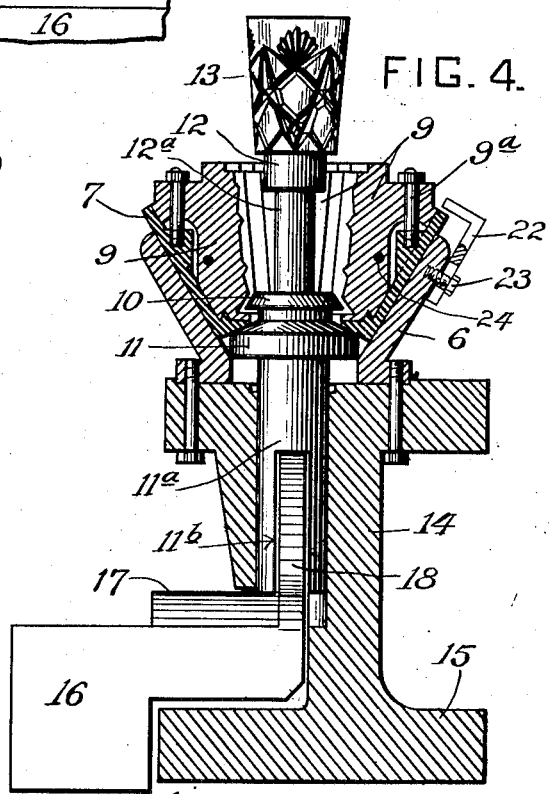

Figure 1 is a plan view of a mold designed for an imitation cut glass tumbler such as shown in Fig. 4; Fig. 2 is a central vertical section of the mold in place on a holder and the glass being pressed therein by a plunger; Fig. 3 is a plan view of the mold after being opened, and Fig. 4 is a central vertical section of the mold shown open and the finished article being automatically ejected; Fig. 5 is a detached detail showing the cams for opening the mold and ejecting the article, as in Fig. 4.

In making such articles, for example, as glass tumblers, simple block molds can be used only where the surface is plain and can be withdrawn in line with the axis of the mold. For figured articles such as indicated in Fig. 4, it has been customary to use a hand machine and hand mold having sections jointed and hinged together; but in these the pressure on the glass tends to open the joints, and in opening the surfaces of the mold recede in a swinging direction, not radial to the article, and thus mar the surface. This swinging feature also makes it impossible to press certain forms having true radial surfaces, and is otherwise objectionable.

In the drawing I have shown a holding socket 6 having inclined interior surfaces with undercut grooves in which a series of slides 7 move and are held therein by a tongue-and-groove joint, as shown in Fig. 1. On the slides 7 are the sections 9 of the mold, removably attached by bolts $9^a$. When the slides and the sections are shoved downward they close tightly together along their vertical joints, and the bottom of the mold is formed by a head 10 supported by the head 11, which latter fits within an opening in the bottom of the socket 6 and is provided with a split tubular shank $11^a$ resting in a support 14. Also seated within the heads 10 and 11 is an ejector and valve head 12 which is carried on a shank $12^a$ within the tube $11^a$. In pressing the glass 13 into the mold the latter may be conveniently supported with other like molds on a large traveling ring 14 whose base 15 may be supported and moved as desired by any convenient mechanism to pass the mold under a plunger 19.

At the proper point along the travel of the ring 14 a block 16 is placed stationary, and it carries the two opening cams 17 and 18, as shown in Figs. 4 and 5. The plunger 19 has the usual cover ring 20, held down by the usual spring plate 21; after it has entered the article and pressed it as shown in Fig. 2, and these parts have been withdrawn, the support 14 carries the mold upon the cams 17 and 18. The two shanks $11^a$ and $12^a$ are thereby raised together until the bottom and the side sections of the mold have been all raised together to their open positions, as shown in Fig. 4—the slides 7 moving both upward and outward by reason of the slant of the guide socket 6. The action of cam 17 now ceases, and the parts of the mold having been entirely separated from the article by direct radial motion, the cam 18, working in the slot $11^b$ of the tube $11^a$, continues to act upon the rod $12^a$, and with the head 12 raises the finished article 13 entirely out of the mold, where it may be cooled and lifted off.

The mold may be used as a hand mold, and in some cases it may be desirable to invert the mold to eject the article. It will be observed that the parts of the mold will open by gravity, in a manner similar to that above described. In order that the sections may move together, I provide guide pins between the joints of the mold, as indicated at 24 in Fig. 3. In order to prevent the sections coming out of the mold, I may also use a stop 22 as shown in Fig. 4, which is attached by a bolt 23 in a slot of the stop 22, thus fixing it adjustably in position on the frame 6, so that the degree of opening can be controlled. The sections of the mold, 9, may be changed at will by loosening the bolts 9ª, using the same frame 6 and slides 7 as before, and thus altering the designs without requiring a complete new mold, as is now customary.

It will be noted that the downward pressure both of the ring and plunger 19 and of the spring plate 21, tend to close the vertical joints of the mold tighter; also that the mold sections open easily and quickly and in opening move in a true radial direction with relation to the article. The operation is entirely automatic, and the mold is equally adapted to use in any other power machine. Any desired means for removing the article after the mold is opened may be used, and in general it will be understood that my invention is not limited to the details of the construction shown, nor use in the manufacture of any particular article. Other advantages will readily occur to those familiar with the art.

Having thus described my invention and illustrated its use, what I claim as new and desire to secure by Letters Patent, is the following:

1. A glass pressing mold for co-operation with a plunger and press ring, comprising a socket having inclined faces, and mold sections radially divided and slidingly attached on said inclined surfaces to close and open, whereby the pressure of the ring and plunger closes the mold.

2. The combination with a holder having inclined faces, of a mold comprising sections slidingly attached on said faces, and means for raising the bottom of the mold and thereby opening the sections by sliding them on said surfaces, substantially as described.

3. A press mold composed of sections divided on radial planes and having inclined outer faces and a holder for the sections having inside inclined supporting surfaces, whereby downward pressure by the plunger on the mold sections will close them in radial direction, substantially as described.

4. The combination of a holder socket having inclined guide-ways, and a plurality of press mold sections divided on radial planes and sliding on said guide-ways, and adapted to close radially, and means to open the mold by sliding the sections upwardly on the guide-ways.

5. The combination with a holding socket having inclined guideways, of a mold composed of sections engaging said guideways, and a double movable bottom for the mold, of which one part is adapted to lift the sections and the other part to eject the article after the sections are opened.

6. A mold composed of sections with inclined outer faces, a socket having inclined guideways positively engaging said faces, means for lifting the sections in the socket to open the sections, and to eject the article.

7. In a sectional mold the combination of a socket having inclined guideways, sections engaging the same and adapted to be pressed together by vertical pressure on the mold, and vertically operating means to open the mold and eject the article.

8. In a mold the combination of a socket with inclined guide slots, sections sliding in said guide slots, a movable bottom for the mold adapted to raise the sections in the guide slots, and an ejecting plunger movable independent of the bottom and through the same, substantially as described.

9. A sectional glass pressing mold comprising a socket having inclined guides, bearing plates in said guides, and co-operating radially divided mold sections removably attached to the said bearing plates, whereby the mold sections are interchangeable.

10. The combination with a sectional mold adapted to be opened by vertical movement of the parts, of a movable bottom partly supporting and adapted to raise said parts, an ejector spindle working through the bottom, and cam devices adapted to first raise the mold sections to open the mold, and then eject the article therefrom.

11. A sectional mold comprising parts adapted to be closed by downward pressure thereon, an inclined holder supporting said parts, and a movable bottom adapted to engage and raise the sectional parts in the holder and simultaneously raising the article as the mold opens, substantially as described.

12. A radially divided sectional mold, combined with a support having guides engaging and adapted to open the sections of the molds, by sliding movement therein, in an upward and outward radial direction, substantially as described.

13. A glass pressing mold comprising radially divided sections, a movable bottom engaging the sections, and a support the sections and support having inclined engaging faces, whereby the sections are opened when pushed upward in the support.

In testimony whereof I have hereunto signed my name in the presence of the two subscribed witnesses.

THEODORE C. STEIMER.

Witnesses:
F. W. H. CLAY,
CHAS. S. LEPLEY.